United States Patent [19]

Tanaka et al.

[11] Patent Number: 4,910,736
[45] Date of Patent: Mar. 20, 1990

[54] ENCODING METHOD AND APPARATUS FOR RECORDING DATA WITH AN IDENTIFICATION CODE AND AN ERROR CHECK CODE

[75] Inventors: Masato Tanaka; Takuji Himeno; Yoichiro Sako, all of Tokyo, Japan

[73] Assignee: Sony Corporation, Tokyo, Japan

[21] Appl. No.: 150,388

[22] Filed: Jan. 29, 1988

[30] Foreign Application Priority Data

Jan. 30, 1987 [JP] Japan ............................. 62-P019824
Jan. 30, 1987 [JP] Japan ............................. P019825
Jan. 30, 1987 [JP] Japan ............................. 62-P019823

[51] Int. Cl.⁴ .................................................. G06F 11/10
[52] U.S. Cl. ...................................... 371/37.7; 371/40.3
[58] Field of Search .................... 371/37, 38, 39, 40, 371/37.1, 37.7, 38.1, 39.1, 40.1, 40.3; 360/48, 53, 54, 57, 25, 27

[56] References Cited

U.S. PATENT DOCUMENTS

| 4,375,100 | 2/1983 | Isuji ............................. 371/38 |
| 4,559,568 | 12/1985 | Watanabe ................. 371/39 X |
| 4,607,367 | 8/1986 | Ive ............................ 371/38 X |
| 4,682,332 | 7/1987 | Okamoto ..................... 371/38 |

FOREIGN PATENT DOCUMENTS

| 0132086 | 1/1985 | European Pat. Off. . |
| 0139443 | 5/1985 | European Pat. Off. . |
| 0150811 | 8/1985 | European Pat. Off. . |

*Primary Examiner*—Jerry Smith
*Assistant Examiner*—Robert W. Beausoliel

[57] ABSTRACT

For recording digital data on a recording medium, an identification code for indicating that the digital data is a series of recording data and an error check code for error checking of digital data forming a block are added for each block of the data. The identification code is inherently contained in the error code to suppress an increase of redundancy.

18 Claims, 12 Drawing Sheets

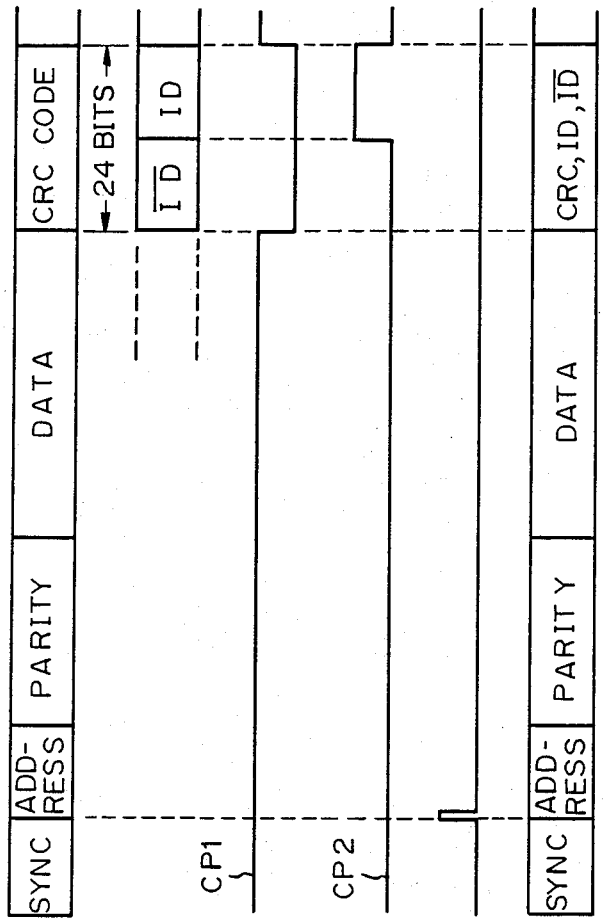

ENCODING METHOD AND APPARATUS FOR RECORDING DATA WITH AN IDENTIFICATION CODE AND AN ERROR CHECK CODE

BACKGROUND OF THE INVENTION

1. Field of the Invention

The invention relates to an encoding method and apparatus suited for recording digital data such as a digital audio signals.

2. Description of Prior Art

In a digital tape recorder for recording/reproducing a digital audio signal with a rotating head, for example, data is recorded on a recording medium to a saturated degree. For this reason, rewriting the data can be attained without using an erasing head by recording new data onto already recorded data directly. However, when the recording/reproducing operation of data is done with different apparatuses, there is a possibility that data to be erased is left as it is due to insufficient compatibilitY between those apparatuses.

FIG. 1 shows data recording patterns formed by overwriting data through a pair of rotating heads disposed at an opposed interval of 180°, for example. In FIG. 1, a track Ra indicated by a solid line shows a track formed when an apparatus A records data, and a track Rb indicated by a broken line shows a track formed when an apparatus B records data. This is a case where data recording positions of the tracks Ra and Rb do not coincide with each other, as shown in FIG. 1, because of a mechanical variation in the tape running mechanism between the apparatuses. First, data is recorded by the apparatus A to from the track Ra. Next, when new data is recorded on this data by the apparatus B, an area of the track Ra where the rotating head of the apparatus B does not scan (area indicated by an oblique line at B of FIG. 2) is left without being erased. Therefore, if a magnetic tape having the recording patterns shown in FIG. 1 is reproduced by the apparatus A, there is a possibility that unnecessary data or data (whose) reproduction is not desired is read out, because the rotating head starts scanning from an area shown by the oblique line. In the case where a digital audio signal is recorded/reproduced by a rotating head, an error detection/error correction code is usually employed. An example of encoding of the error detection/error correction is shown in FIG. 3.

In FIG. 3, audio data of (mxn) words and P parity and Q parity developed from the audio data are arranged in a two-dimensional fashion. The P parity is formed of n words in a predetermined direction of data of the two-dimensional arrangement, for example, in a oblique direction. The Q parity is formed of n words in another direction of the data of the two-dimensional arrangement, for instance, in a column direction. An error detection code such as a CRC (cyclic redundancy check) code or an error correcting code such as a Reed-Solomon code is employed to form the parity. An error check code is formed as data of one block, on the basis of n-word data disposed in the column direction of the two-dimensional arrangement data which is composed of the (mxn)-word data, and the parity (P, Q) and address data are added to the data of each column. Further, a synchronization signal is added to the block data and sequentially recorded on a track of a tape-like recording medium. As a result, data of m blocks is sequentially arranged on each track. For the error check code, the error check detecting code or the error correcting code can be used in a manner similar to the P parity and the Q parity. Meanwhile, the error check code is added to check the presence of absence of an error of each block, and the block data is handled as correct data (in the absence of an error of the block data) even when the block data that should not be reproduced exists due to the fact that data is left without being erased. For this reason, if data is read out of an area in which the data is left without being erased due to insufficient compatibility between different apparatuses as mentioned above, the data cannot be detected as unnecessary data. Consequently, a serious problem results, in that an abnormal sound is generated. Also, without being limited to such insufficiency of compatibility between the apparatuses, the same problem as that mentioned above is brought about when dust which adhered at the time of recording is dropped off at the time of partial reproduction for previously recorded data.

To solve this problem, an adoption of an identification signal (hereunder called "ID code") as described in the Japanese Patent Disclosure No. 1675/1985 laid open to public inspection has been proposed by the same applicant as the present application. The ID code is a binary code of plural bits, and a predetermined value is allotted to the ID code for every occurrence of a series of recording data. By monitoring the ID code at the time of reproduction, undesirable data mistakenly contained with reproduction data can be detected and eliminated even when no error is found by the error check code.

FIG. 4 shows an example of a recording format of data recorded by a rotating head type digital tape recorder. One block-data length has 288 bits, and an eleven-bit block synchronization signal comes at the head thereof, a thirteen-bit block address then appears, and finally parity (P, Q) of 48 bits (12 bits x 4 words) for detection and/or correction of audio data comes next.

16-word audio data L1, R1, R2, ... L8, R8 (L: audio data of left channel, R: audio data of right channel) are positioned after the parity, and an ID code ID (8 bits) and a CRC code (16 bits) serving as an error check code are added after the audio data. The CRC code performs error detection of the remaining 261-bit data except the block synchronization signal.

Also, it can be conceived, as an alternative, that both of the ID code and the CRC code have twelve bits.

The ID code, which is indicative of a series of recording, provides high identification capability when an increased bit number is used, to eliminate the possibility that there is an accidental coincidence in ID codes between objective data and data which has not been erased. From this standpoint, it is desirable that the bit number of the ID code is made larger.

On the other hand, the probability of erroneous detection of the error check code becomes lowered with an increased bit number. Therefore, it is desirable that the bit number of the error check code be made greater. However, there is a limitation to redundancy, and it tends to be difficult to fully secure the bit number of both the ID code and the error check code.

SUMMARY OF THE INVENTION

An object of the invention is, therefore, to provide an encoding method and apparatus with improved ID-code identification capability and error detection capability of the error check code without increasing redundancy in recording digital data.

According to one aspect of the invention, there is provided an encoding method of an identification code and a first error check code for sequentially recording block data, having the identification code and the error check code, onto a recording medium for every occurrence of a predetermined number of words, comprising the steps of:

forming the error check code for checking an error within the predetermined number of words on the basis of these words;

performing a predetermined operation for the error check code and for the identification code; and adding the error check code in which the identification code is contained inherently through such predetermined operation to said predetermined number of words.

According to another aspect of the invention, there is provided an encoding apparatus for encoding an identification code and a first error check code, in sequentially recording block data, having the codes on a recording medium for every occurrence of a predetermined number of words, comprising:

means for forming the error check code for checking of an error within the predetermined number of words from these words;

means for performing a predetermined operation for the error check code and the identification code; and means for adding the error check code with the identification code contained therein by said predetermined operation to the predetermined number of words and outputting the result.

BRIEF DESCRIPTION OF THE DRAWINGS

The present invention will be apparent from the following detailed description when taken in conjunction with the accompanying drawings, in which:

FIGS. 7A-7E, 11A-11F and 15A-15F are timing charts for describing the operations of the encoders;

In the drawing, like reference numerals denote like structural elements.

DESCRIPTION OF THE PREFERRED EMBODIMENTS

Figure 1:
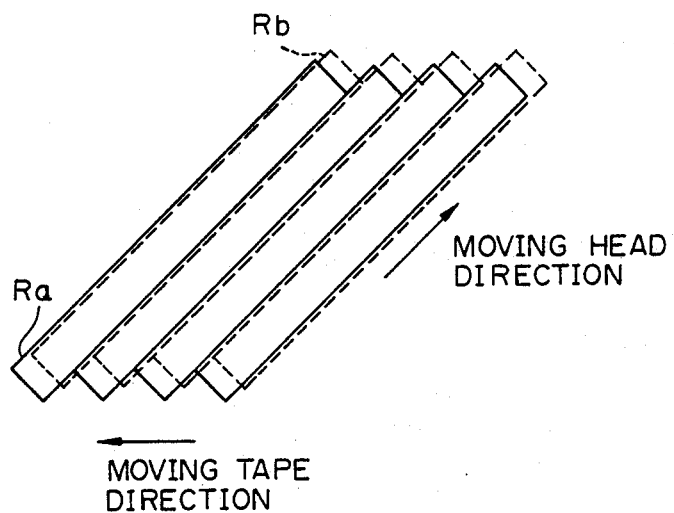
FIGS. 1 and 2 show diagrams of data recording patterns.
Figure 2:
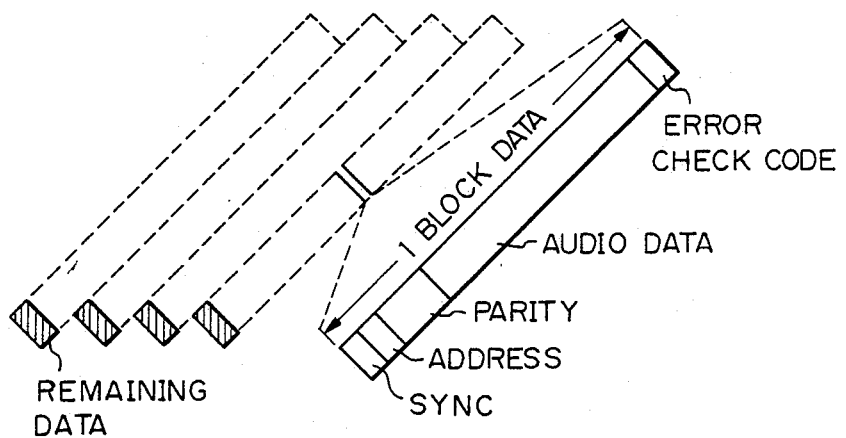

Embodiments of the invention will be described hereunder referring to the drawings. Each of the embodiments records a digital audio signal, which has been subjected to error correction coding by a pair of rotating heads disposed at an opposed interval of 180°, onto a magnetic tape.

Figure 5:
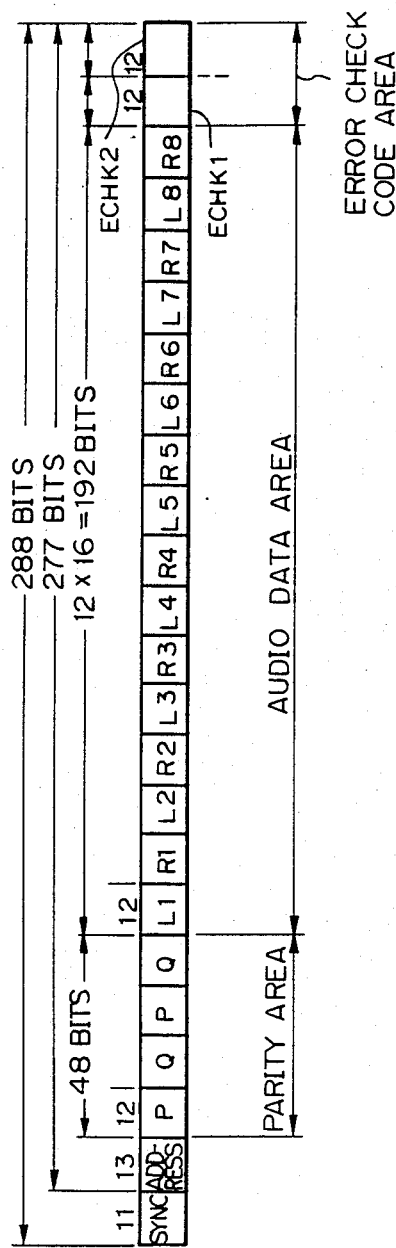
FIGS. 5 and 9 show diagrams of two structures of block data to which the present invention is applied.

FIG. 5 shows a data structure of each block recorded on each track of a magnetic tape. As shown in FIG. 5, one block has a length of 288 bits and an eleven-bit block synchronization signal comes at the head thereof, a thirteen-bit block address then appears, and finally parity (P, Q) of 48 bits (12 bits x 4 words) for error detection and/or error correction of audio data comes next. In each word, the head represents the most significant bit, and the last bit indicates the least significant.

Figure 3:
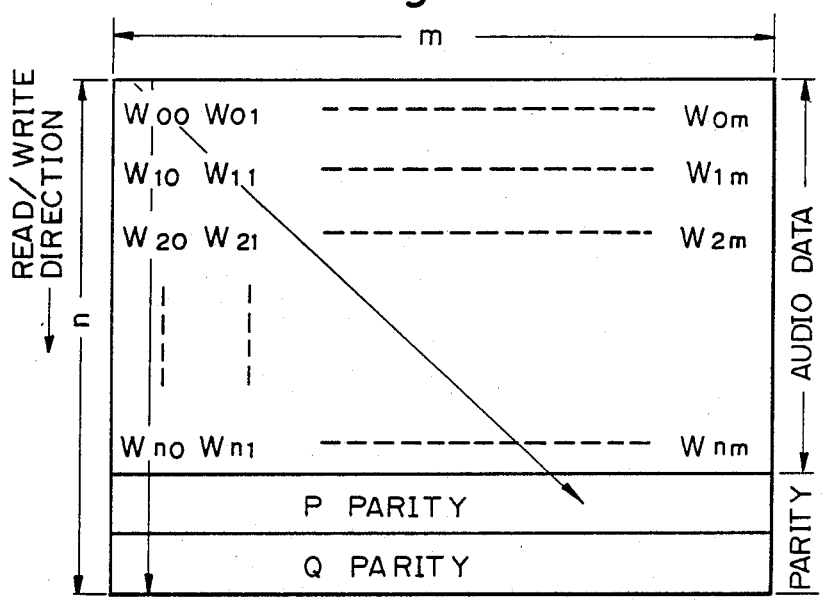
FIG. 3 shows a diagram of parity generation sequence for detection and/or correction of a data error.

After the parity, audio data of 16 words L1, R1, L2, R2, . . . L8, R8 (L: audio data of left channel, R: audio data of right channel) are positioned. An identification code next to the audio data is inherently provided within a first error check code ECHKI of 12 bits. Further, a second error check code ECHK2 of 12 bits is added. In FIG. 5, the parity (P, Q) corresponds to the P parity and the Q parity shown in FIG. 3, respectively. In FIG. 5, the second error check code ECHK2 is formed of a CRC (cyclic redundancy check) code for data of the remaining 265 bits except the block synchronization signal. The first check code is developed by an operation of Exclusive OR between a parity word, which is developed through Exclusive OR of the address data, parity (P, Q) and the 16-word audio data and the ID code ID.

It is to be noted that since the address data shown in FIG. 5 has thirteen bits, twelve bits (all except a predetermined bit) are employed to perform an operation of Exclusive OR.

In the reproduction, error checking is carried out for the address data, parity (P, Q), audio data and the first error check code ECHKI, using the ECHK2. When no error is detected with this checking, an identification code ID, which is inherently contained at the first error check code, is calculated based on the address data, parity (P, Q), audio data and the first error check code ECHK1. Specifically, the identification code is extracted by an operation of Exclusive OR of the address data, parity (P, Q), audio data and first error check code ECHK1. A decision of whether a series of recording data is present is made with the comparison between the extracted ID code and an ID code reproduced from the magnetic tape and memorized in advance. Also, when the comparison of the extracted ID code with the ID code stored in advance shows that there is no error data, it is judged that error checking has been executed with the error check code ECHK1.

Figure 6:
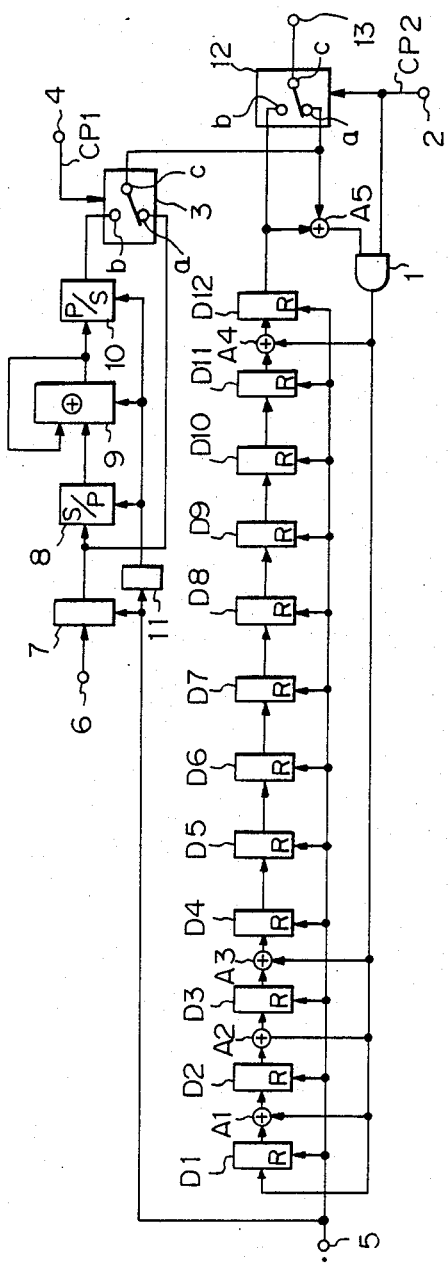
FIGS. 6, 10 and 14 show diagrams of several embodiments of encoders for achieving the invention.

Referring to FIG. 6, an encoder provided on the recording side will be described. A CRC code generating circuit is composed of a shift register circuit of 12 flip-flops D1 to D12 cascaded and adders A1, A2, A3, A4 and A5 of (mod. 2) inserted between the flip-flops D1 and D2 between the flips-flops D2 and D3, between the flip-flops D3 and D4, between the flip-flops D11 and D12 and at an output side of the flip-flop D12. The adders of (mod. 2) are made up of Exclusive OR gates.

In this embodiment, the following equation is employed as a generating function of the CRC code:

$$G(x) = S^{24} + x^{23} + x^6 + x^5 + x + 1$$

Serial data is supplied to the flip-flop D1 via an AND gate 1. The output data of the adder A5 and a control pulse CP2 from a terminal 2 are supplied to the AND gate 1. The output signal of the flip-flop D12 of the shift register circuit and input data, through a switching circuit 3, are fed to the adder A5. The switching circuit 3 controls a connection state between input terminals a, b and an output terminal c by a control pulse CP1 from a terminal 4. A common start pulse from a terminal 5 is supplied to the flip-flops D1 to D12 of the shift register circuit for developing the CRC code. All the flip-flops are reset with the start pulse.

Input data containing the ID code is supplied to an input terminal shown at 6, and the input data is given to a serial to parallel converter 8 through a resister 7. A twelve-bit parallel output signal from the serial to parallel converter 8 is fed to an Exclusive OR circuit 9. The output signal of the Exclusive OR circuit 9 is supplied to a parallel to serial convert 10 and fed back to its own input side. As a result, the Exclusive OR circuit 9 forms Exclusive OR data of each word supplied sequentially.

The start pulse from the terminal 5 is fed to the resister 7, and the start pulse delayed by one bit by a dely circuit 11 is supplied to the serial to parallel converter 8, the Exclusive OR circuit 9 and the parallel to serial converter 10. By the delay circuit 11, a predetermined one bit, for example, one bit of the head in 13-bit data representing of the block address, is removed, and the conversion into 12-bit data is performed. Serial data from the parallel to serial converter 10 and input data from the resister 7 are supplied to the two input terminals a and b of the switching circuit 3, respectively.

To one input terminal b of the switching circuit 3 connected to the parallel to serial converter 10 is supplied the first error check ECHKl, which is developed by Exclusive OR between 21 words composed of the address data, parity (P, Q) and audio data to form one block and the ID code. Serial data in which the first error check code ECHK1 is inserted in place of the ID code, is taken out at the output terminal c of the switching circuit 3.

The output signal of the switching circuit 3 is supplied to the adder A5 and to an input terminal a of the switching circuit 12. To an input terminal b of the switching circuit 12 is supplied the CRC code developed at output of the shift resister circuit. Output data with the CRC code added is produced at an output terminal c of the switching circuit 12 and taken out from an output terminal 13. Thus, the first and second error check codes ECHKl and ECHK2 are made by the encoder.

Figure 7:
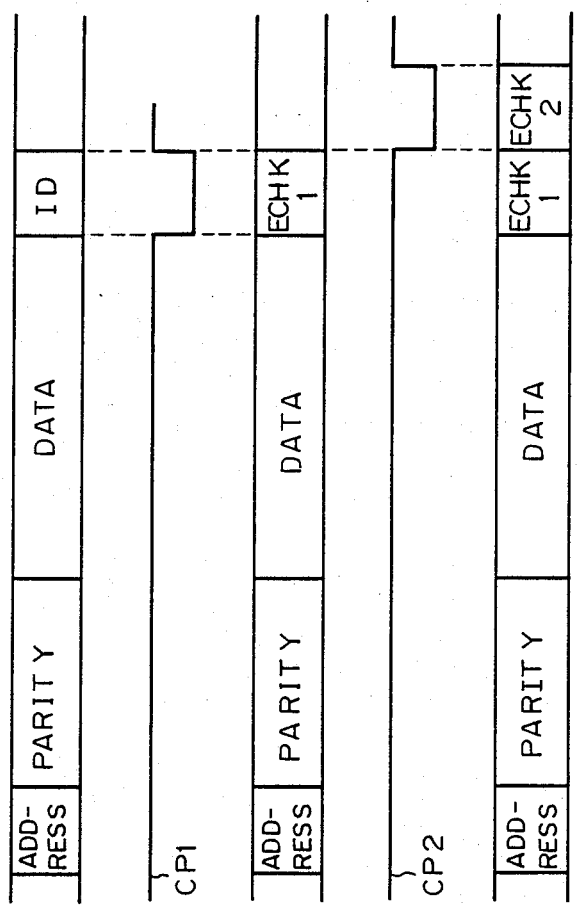

FIG. 7 is a timing chart for describing the operation of the encoder. Line A of FIG. 7 indicates recording data supplied to the input terminal 6 in FIG. 6. The content of the ID code is incremented in response to a recording start operation in a tape recorder.

The control pulse CP1 takes a low level at the timing of the ID code as shown at B of FIG. 7. The switching circuit 3 is controlled so that the input terminal a and the output terminal c are connected when the control pulse CP1 assumes a high level, while the input terminal b and the output terminal c are connected when the control pulse CP1 takes a low level. As a result, serial data with the first check code ECHKl inserted therein in place of the ID code is generated at the output terminal c of the switching circuit 3 as shown at C of FIG. 7.

By the control pulse CP2 shown at D of FIG. 7, the switching circuit 12 is controlled so that the input terminal a and the output terminal c are connected when the control pulse CP2 takes a high level, while the input terminal b and the output terminal c are connected when the control pulse CP2 takes a low level. As shown at E of FIG. 7, serial data which is added with the CRC code made for the address data, parity (P, Q), audio data and first error check code ECHKl of one block, is obtained.

Figure 8:
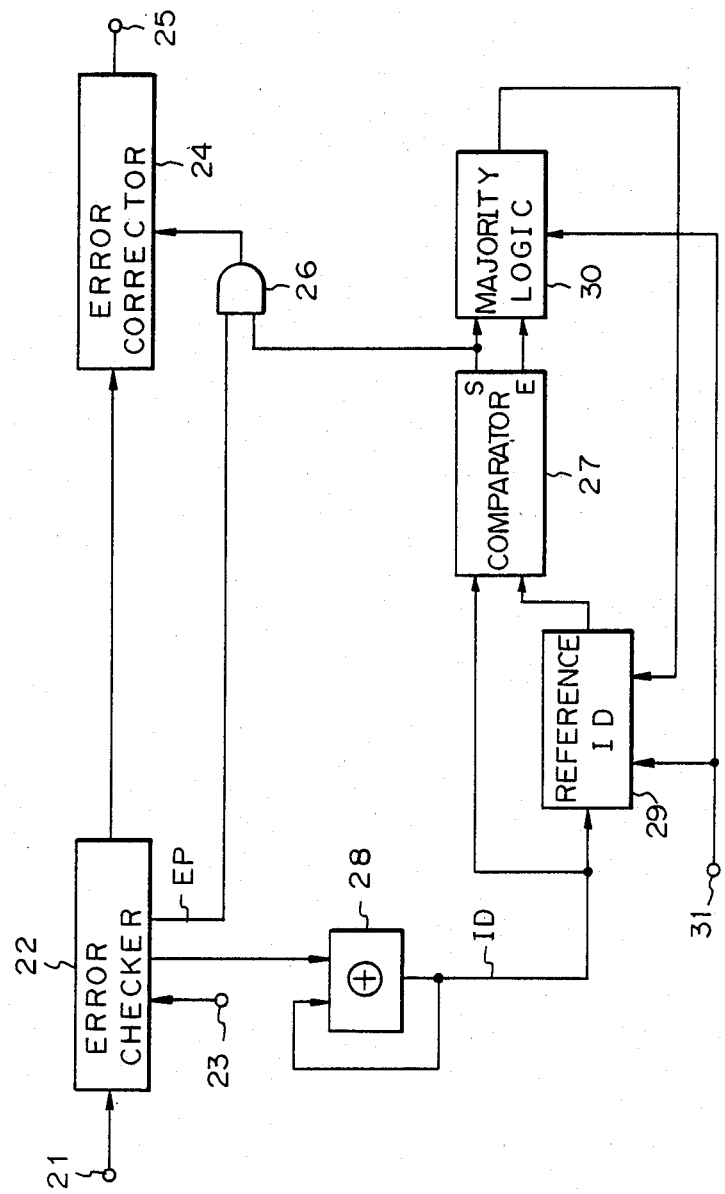
FIGS. 8 and 12 show diagrams for embodiments of decoders for decoding data encoded at the encoders.

FIG. 8 shows the structure of a decoder provided on the reproduction side. In FIG. 8, reproduction data is supplied to an input terminal shown at 21, and error detection is made for every block by an error checker 22 using the second error check code ECHK2. A timing signal is supplied to the error checker 22 from a terminal 23 in synchronism with the reproduction data. The reproduction data is supplied to an error corrector 24 through the error checker 22. The error corrector 24 carries out an error detection/error correction operation for audio data by using the parity (P, Q) reproduced from one track. The data from the error checker 22 contains an error flag developed based on the error check code ECHK2, and the error corrector 24 performs an error correction by referring to the error flag.

Also, even when no error is detected by the second error check code ECHK2, for the purpose of preventing irrelevant data caused due to insuffient compatibility between the tape recorders, etc. from being mistakenly contained, reproduction data is written into a memory provided at the error corrector 24 only if the output signal of an AND gate 26 takes a high level. An error pointer EP for indicating the presence or absence of an error from the error checker 22 and a coincidence output from a comprator 27 are supplied to the AND gate 26.

The reproduction data from the error checker 22 is supplied to an Exclusive OR circuit 28, and an ID code ID inherently contained in the first error check code ECHK1 is extracted from the circuit 8. Clearly, the Exclusive OR circuit 28 has a feedback loop and generates an Exclusive OR output of the address data, parity (P, Q), audio data and first error check code ECHKI, which form one block. As a result, in the absence of an error, an original ID code is produced from the Exclusive OR circuit 28. The extracted ID code ID is fed to the comparator 27, with a reference ID code from the circuit 29.

The comparator 27 detects the coincidence/non-coincidence between the extracted ID code ID and a reference ID code stored in the reference ID setting circuit 29. In response to the detection of the coincidence, a coincidence output taking a high level is supplied to the AND gate 26 and to a majority-decision logic circuit 30. A comparison output E assumes a high level in the case of the non-coincidence at the compartor 27 and is also supplied to the majority-decision logic circuit 30, and, for instance, the number of coincidence outputs (S) and of non-coincidence outputs (E) are compared after a rotating head has scanned one track.

At the reference ID code setting circuit 29, ID codes ID extracted from two or three blocks in one track are sampled, and the coincidence/non-coincidence between these two or three sampled ID codes ID is checked. The sampling of the ID code may be done only for the one for which it has been judged that there is no error, referring to the error pointer EP. When the ID codes coincide with each other and when the judgment of the majority-decision logic circuit 30 is (S<E), it is judged that the ID codes have changed, and the reference ID code is altered immediately before the initiation of the scanning of the next track. In the case where both conditions are not satisfied, the reference ID code is not altered. To the reference ID setting circuit 29, and the majority-decision logic circuit 30, is supplied a timing pulse in synchronism with the scanning of the rotating head from the terminal 31.

Although the first error check code ECHK1 is developed by Exclusive OR of data in one block, another code such as a CRC code or a Reed-Solomon code may be adopted for the development of the code ECHK1.

Also, for the second error check code added for every block, a code other than the CRC code can be used. In addition, the present invention is applicable not only to a rotating head type digital tape recorder but also to a fixed head type digital tape recorder.

Next, a second embodiment to which the present invention is applied is described. In the above-mentioned first embodiment, the first and second error check codes are provided, and an ID code is inherently contained in the first error check code. In this second embodiment, only a single error check code is employed, and an ID code is inherently contained at predetermined bits of the error check code.

Figure 9:
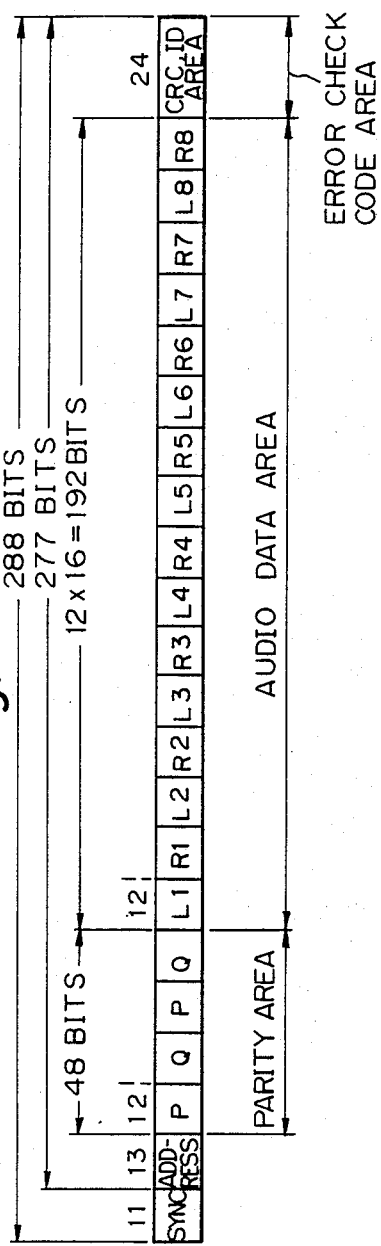

FIG. 9 shows a recording format of data recorded on a magnetic tape. In comparison with FIG. 5, FIG. 9 is different in the error check code area. In detail, a 24-bit error check code area is added after audio data of 16 words. Although a CRC code is employed as the error check code in this embodiment, a code such as a BCH code or a Reed-Solomon may be used without being limited to the CRC code as described before. Further, a 12-bit ID code is inherently provided at the CRC code. In this embodiment, the ID code is inherently contained in the CRC code by an operation of Exclusive OR of twelve lower bits of the CRC code and the ID code.

Figure 10:
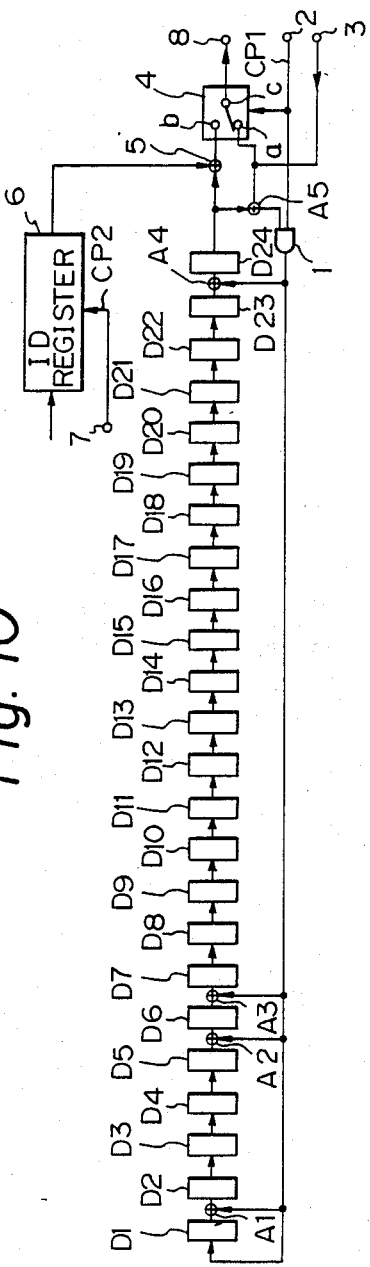

Referring to FIG. 10, an encoder provided on the recording side will be described. A CRC code generating circuit is composed of a shift register circuit of 24 flip-flops D1 to D24 cascaded and adders A1, A2, A3, A4 and A5 of (mod. 2) inserted between the flip-flops D1 and D2, between the flip-flops D5 and D6, between the flip-flops D6 and D7, between the flip-flops D23 and D24 and at an output side of the flip-flop D24. The adders of (mod. 2) are made up of Exclusive OR gates.

In this embodiment, the following equation is employed as a generating function of the CRC code:

$$G(x) = x^{24} + x^{23} + x^6 + x^5 + x + 1$$

Serial data is supplied to the flip-flop D1 via an AND gate 1. The output data of the adder A5 and a control pulse CP1 from a terminal 2 are supplied to the AND gate 1. The output signal of the flip-flop D24 of the shift register circuit and input data from a terminal 3 are fed to the adder A5. A common start pulse, though not shown, is supplied to the flip-flops D1 to D24 of the shift register circuit for developing the CRC code. All the flip-flops are reset with the start pulse.

A CRC code of 24 bits developed at the shift register circuit is supplied to the adder 5. To this adder 5 is given a twelve-bit ID code from an ID register 6. A control pulse CP2 is supplied to the ID register 6 from a terminal 7. With this control pulse CP2, the ID code ID is produced from the ID register 6 in synchronism with the timing at which a less significant or lower twelve-bit code CRC·L of the 24-bit CRC code is supplied to the adder 5. At the adder 5, an operation of Exclusive OR of (CRC·L+ID=CRC·L') is performed to develop a code signal CRC·L'.

Address data, parity (P, Q) and audio data inputted from the terminal 3 are supplied to one input terminal a of a switching circuit 4, and the output data of the adder 5 is supplied to the other input terminal b of the switching circuit 4. An output terminal c of the switching circuit 4 is derived as an output terminal 8. The switching circuit 4 is controlled by the control pulse CP1. Specifically, when the control pulse CP1 takes a high level, the input terminals a and c are connected so that the input data is taken out at the output terminal 8, whereas when the control pulse CP1 assumes a low level, the input terminals b and c are connected so that the code signal CRC·L' from the adder 5 is produced at the output terminal 8. As a result, serial data in which the CRC·L' is inserted in place of the CRC·L' is taken out from the terminal 8.

Figures 11A, 11B, 11C, 11D, 11E, 11F:
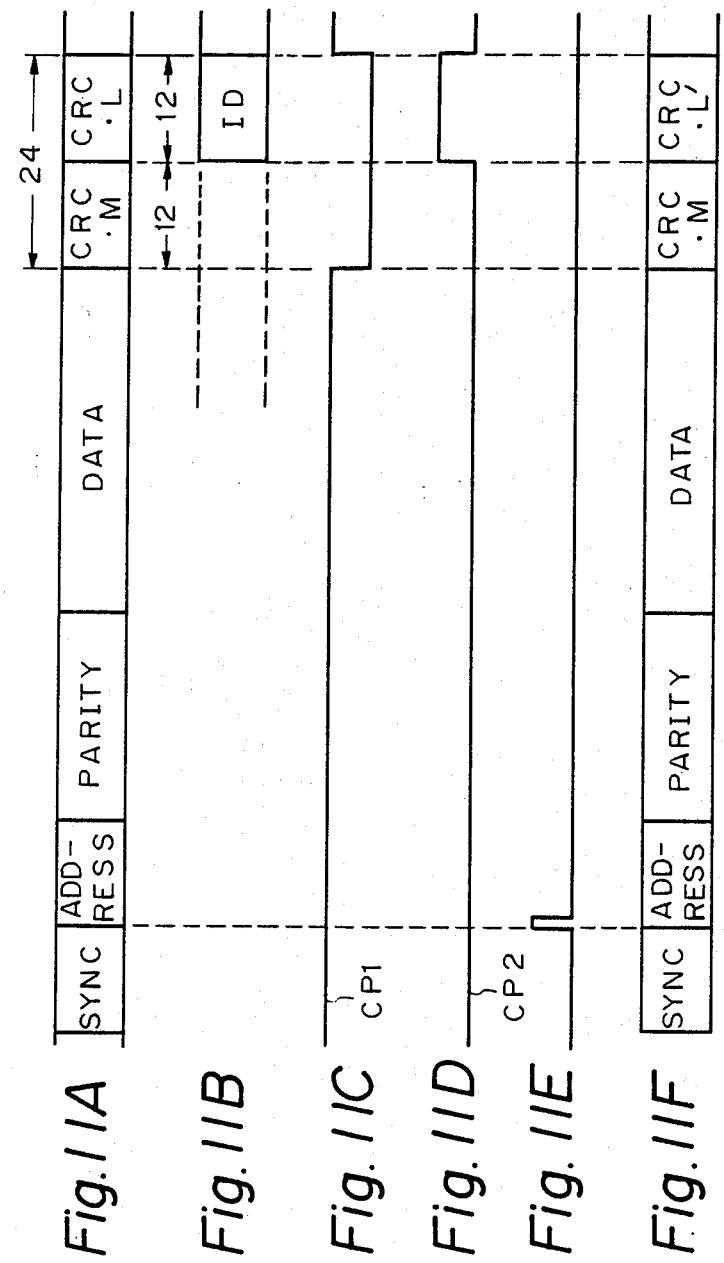

FIG. 11 is a timing chart for illustrating the operation of the above-mentioned encoder on the recording side. Line A of FIG. 11 shows the recording data from the input terminal 3 and a CRC code (CRC·M and CRC·L) formed of the recording data. The AND gate 1 and the switching circuit 4 are controlled by the control pulse CP1 shown at C of FIG. 11 to develop the 24-bit CRC code.

Line B of FIG. 11 also indicates the ID code ID produced from the ID register 6 by the control pulse CP2 shown at D of FIG. 11. An exclusive OR output (CRC·L') of the less significant code CRC L and the ID code ID is given by the adder 5. Since the more significant or upper code CRC·M of the CRC code and the code signal CRC·L' are supplied to the input terminal b of the switching circuit 4, serial data in which the code signal IDm is inserted instead of the original ID code is generated at the output terminal 8 as shown at F of FIG. 11. E of FIG. 11 shows the start pulse for resetting the shift register of the CRC code generating circuit.

Figure 12:
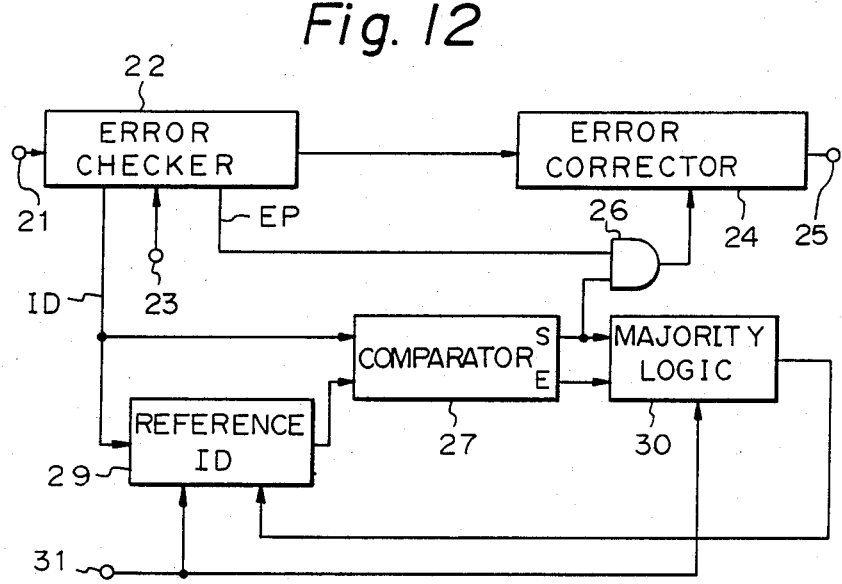

The structure of a decoder provided on the reproduction side will be described referring to FIG. 12. In FIG. 12 reproduction data is supplied to an input terminal shown at 21, and error detection is made for every block by an error checker 22 using a CRC code. A timing signal is given to the error checker 22 from a terminal 23 in synchronism with the reproduction data. The reproduction data is supplied to an error corrector 24 through the error checker 22. The error corrector 24 carries out an error detection/error correction operation for all audio data and parity (P, Q) reproduced from one track. An error flag developed with the error detection by the use of the CRC code is output from the error checker 22, and the error corrector 24 performs an error correction by referring to the error flag.

Also, even when CRC detection by the CRC code is correct, reproduction data is handled as effective data only when the output signal of an AND gate 26 takes a high level. This is done for the purpose of preventing irrelevant data caused due to insufficient compatibility between the tape recorders, etc. from being mistakenly contained. The effective data is written into a memory provided in the error corrector 24. An error pointer EP for indicating the presence or absence of an error from the error checker 22 and a coincidence output from a comparator 27 are supplied to the AND gate 26.

A reproduction ID code ID from the error checker 22 is fed to the comparator 27 with a reference ID code setting from the circuit 29. The comparator 27 detects the coincidence/non-coincidence between the reproduction ID code ID and the reference ID code stored in the reference ID code setting circuit 29. In response to the detection of the coincidence, a coincidence output taking a high level is supplied to the AND gate 26 and to a majority-decision logic circuit 30.

A comparison output E, which assumes a high level in the case of the non-coincidence at the comparator 27, is also supplied to the majority-decision logic circuit 30, and, for instance, the number of coincidence outputs (S) and of non-coincidence outputs (E) are compared every time a rotating head scans each track.

At the reference ID code setting circuit 29, reproduced ID codes DI from two or three tracks in one track are sampled, and the coincidence/non-coincidence between these two or three sampled reproduction ID codes is detected The sampling of the reproduction ID code may be done for the one for which it has been judged that there is no error, using the error pointer EP. When the reproduction ID codes coincide with each other and when the judgment of the majority-decision logic circuit 30 is (S<E), it is judged that the ID codes have changed, and the reference ID code is altered immediately before the initiation of the scanning of the next track. In the case where both conditions are not satisfied, the reference ID code is not altered. To the reference ID code setting circuit 29 and the majority-decision logic circuit 30 is supplied a timing pulse in synchronism with the scanning of the rotating head from a terminal 31.

Figure 13:
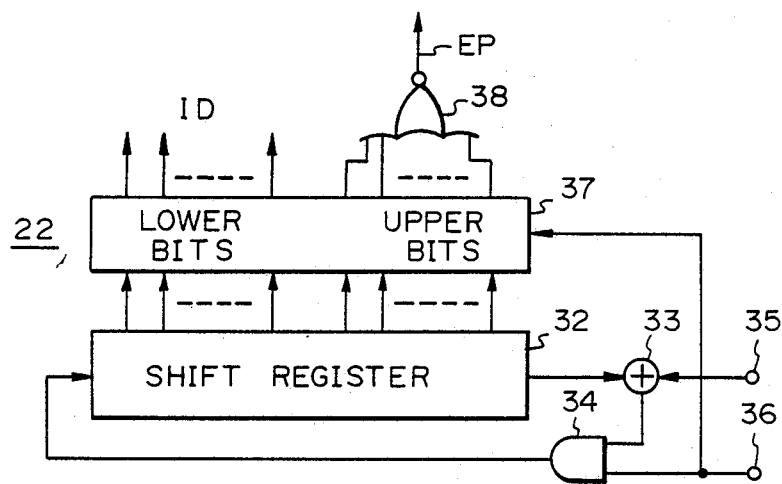
FIGS. 13 and 16 show block diagrams of several embodiments of checkers constituting the decoders.
Figure 4:
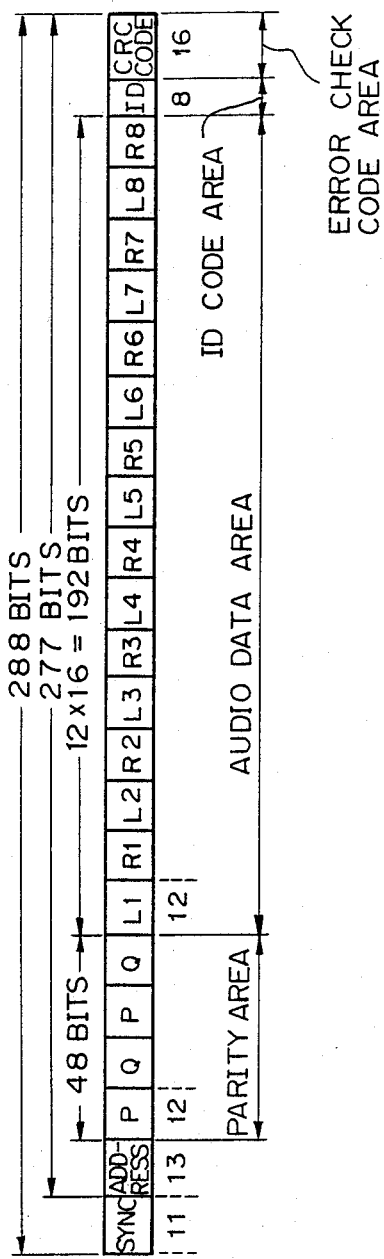
FIG. 4 shows a diagram of a structure of a data block in which an ID code and an error check code are added independently from each other.

The error checker 22 has the structure shown in FIG. 13. In FIG. 13, a shift register circuit shown at 32 is composed of 24 cascaded flip-flops, as is the case with the CRC code generating circuit provided on the recording side. Reproduction data is supplied to an adder S3 connected to the output side of the shift register circuit 32 (corresponding to the adder A5 of FIG. 10) from a terminal 35. The output signal of the adder S3 is fed back to the shift register circuit 32 through an AND gate 34. A control pulse is supplied to the AND gate 34 from a terminal 36. The control pulse takes a low level only in the period of a block synchronization signal of the reproduction data, whereas it takes a high level in the period other than the block synchronization signal. With the control pulse, the supply of the block synchronization signal contained in data of each block to the shift register circuit 32 is inhibited In response to the supply of reproduction data of one block i.e., address data, parity (P, Q), audio data and error check code except the block synchronization signal, data of one block containing a CRC code (except the block synchronization signal) is divided by a generating function in the absence of an error. As a result, the remainder (the content of the shift register circuit 32) shows the ID code. Clearly, if no error is generated, twelve bits on the less significant side form the ID code ID, while all the twelve bits on the more significant side become zero. Conversely, in the presence of an error, the remainder does not become zero. As a result, the twelve bits on the less significant side do not give a correct ID code, and the twelve bits on the more significant side always do not take zero.

The 24-bit parallel output of the shift register circuit 32 is supplied to a latch 37 and latched by a control pulse. Twelve bits on the less significant side from the latch 37 provide a reproduction ID code ID. Twelve bits on the more significant side are supplied to a NOR gate 38, and an error pointer EP is generated therefrom. The error pointer EP from the NOr gate 38 assumes a high level in the absence of an error, whereas it takes a low level in the presence of an error.

A third embodiment to which the invention is applied will be described next. The third embodiment is an improvement of the second embodiment. In the latter embodiment, the 12-bit ID code is inherently contained in the 24-bit error check code, whereas, in the third embodiment, an operation such as an Exclusive OR of the error check code and a 12-bit ID code $\overline{\text{ID}}$, which is composed of respectively inverted bits of the ID code and developed therefrom, is made, in addition to the operation of the ID code and the error check code. The result of the operation is actually recorded on a recording medium as an error check code. As a result, a data recording format in the third embodiment is similar to that of FIG. 9 in the second embodiment.

Figure 14:
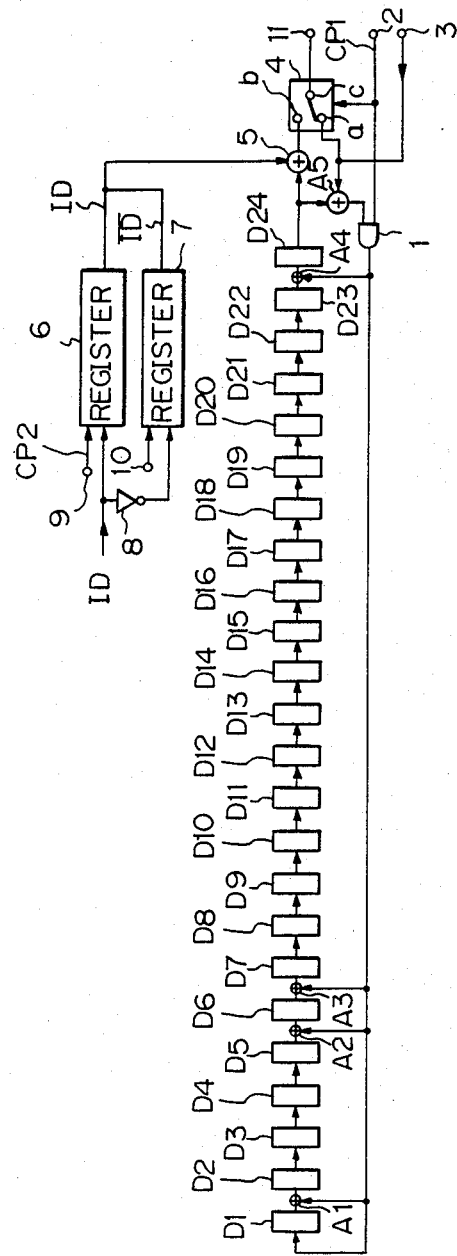

Referring to FIG. 14, an encoder provided on the recording side will b ⒭described. In a manner similar to the second embodiment, a CRC code generating circuit is composed of a shift register circuit of 24 flip-flops D1 to D24 cascaded and adders A1, A2, A3, A4 and A5 of (mod. 2) inserted between the flip-flops D1 and D2, between the flip-flops D5 and D6, between the flip-flops D6 and D7, between the flip-flops D23 and D24 and at an output side of the flip-flop 24. The adders of (mod. 2) are made up of Exclusive OR gates.

In this embodiment, the following equation is also employed as a generating function of the CRC code:

$$G(x) = x^{24} + x^{23} + x^6 + x^5 + x + 1$$

Serial data is supplied to the flip-flop D1 via an AND gate 1. The output data of the adder A5 and a control pulse CP1 from a terminal 2 are supplied to the AND gate 1. The output signal of the flip-flop D24 of the shift register circuit and input data from a terminal 3 are fed to the adder A5. A common start pulse, though not shown, is supplied to the flip-flops D1 to D24 of the shift register circuit for developing the CRC code. All the flip-flops are reset with the start pulse.

A CRC code of 24 bits developed at the shift register circuit is supplied to the adder 5. To this adder 5 are sequentially given a twelve-bit ID code from an ID register 6 and an inverted code $\overline{\text{ID}}$ of 12 bits from an ID register 7. In the ID resister 6 is stored the ID code ID, and the ID code $\overline{\text{ID}}$, inverted bY an interter 8, is stored in the ID resister 7. A control pulse CP2 is supplied to the ID register 6 from a terminal 9. With this control pulse CP2, the ID code ID is produced from the ID register 6 in synchronism with the timing at which twelve less significant bits of the CRC code of 24 bits are supplied to the adder 5. From a terminal 10 a control pulse is supplied to the ID register 7. With this control pulse, in synchronism with twelve more significant bits of the 24-bit CRC code supplied to the adder 5, the inverted ID code $\overline{\text{ID}}$ is produced from the ID register 7. As a result, at the adder 5 an operation of Exclusive OR between the 24-bit CRC code and the 24-bit code formed of the 12-bit ID code and the 12-bit $\overline{\text{ID}}$ code is done, and the code signal obtained by this operation is supplied to an input terminal b of a switching circuit 4.

The input data from the terminal 3 is supplied to one input terminal a of the switching circuit 4, and the output data of the adder 5 is supplied to the other input terminal b of the switching circuit 4. An output terminal c of the switching circuit 4 is derived as an output terminal 11. The switching circuit 4 is controlled by the control pulse CP1. Specifically, when the control pulse CP1 takes a high level, the input terminals a and c are connected so that the input data is taken out at the output terminal 11, whereas when the control pulse CP1 assumes a low level, the input terminals b and c are connected so that the code signal from the adder 5 is produced at the output terminal 11. As a result, serial data is which the code signal of the CRC code with the ID code and the $\overline{ID}$ code inherently contained therein is inserted is taken out from the terminal 11.

FIG. 15 is a timing chart for illustrating the operation of the above-mentioned encoder provided on the recording side. Line A of FIG. 15 shows the recording data from the input terminal 3 and a CRC code formed of the recording data. The AND gate 1 is controlled by the control pulse CP1 shown at C of FIG. 15 to develop the CRC code.

Also, B of FIG. 15 indicates the ID code ID produced from the ID register 6 as shown at D of FIG. 15 by the control pulse CP2 which takes a high level corresponding to the twelve less significant bits of the CRC code and the $\overline{ID}$ code produced by the control pulse from the ID register 7, which the control pulse assumes a high level corresponding to the twelve more significant bits of the CRC code. The code signal shown at B of FIG. 15 is supplied to the adder 5. By the adder 5, an Exclusive OR output of the CRC code and the code signal shown at B of FIG. 15 is developed. Since the output code signal of the adder 5 is supplied to the input terminal b of the switching circuit 4, recording data, in which the code signals with the ID and $\overline{ID}$ are inherently contained in the original CRC code, is produced at the output terminal 11 as shown at F of FIG. 15. E of FIG. 15 indicates a start pulse for clearing the shift register and the CRC code generating circuit.

Figure 16:
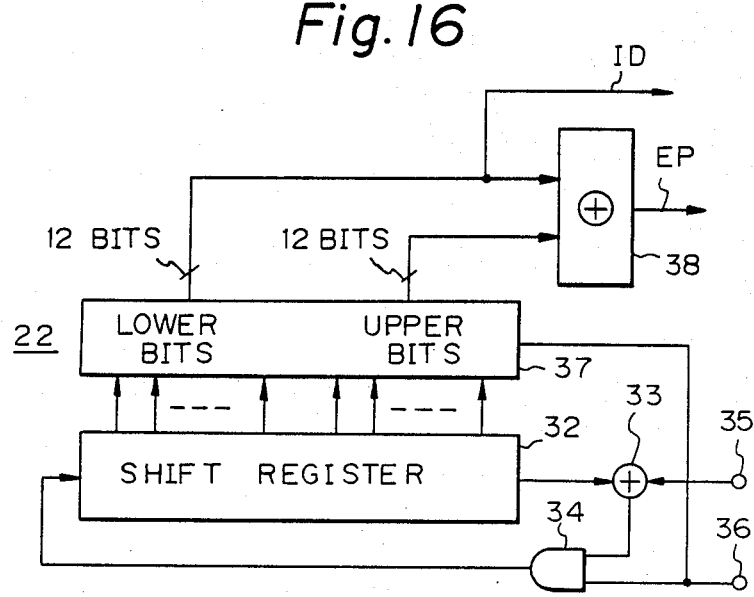

FIG. 16 shows an error checker 22 used in the decoder for decoding data encoded at the encoder shown in FIG. 14. The encoded data is decoded by replacing the error checker 22 of FIG. 12 with that of FIG. 16.

In FIG. 16, a shift register circuit shown at 32 is composed of 24 cascaded flip-flops as is the case with the CRC code generating circuit provided on the recording side. Reproduction data, i.e., address data, parity (P, Q), audio data and CRC code with the error check code inherently contained therein are supplied to an adder 33 connected to the output side of the shift register circuit 32 (corresponding to the adder A5 of FIG. 1) from a terminal 35.

The output signal of the adder 33 is fed back to the shift register circuit 32 through an AND gate 34. A control pulse is supplied to the AND gate 34 from a terminal 36. The control pulse takes a low level only in the period of a block synchronization signal of the reproduction data, whereas it takes a high level in the period other than the block synchronization signal. With the control pulse, the supply of the block synchronization signal contained in data of each block to the shift register circuit 32 is inhibited.

In response to the supply of reproduction data of one block except the block synchronization signal data of one block containing a CRC code (except the block synchronization signal) is divided by a generating function in the absence of an error. As a result, the remainder (the content of the shift register circuit 32) whose twelve bit on the less significant side form an ID code ID and whose twelve bits on the more significant side become the ID code $\overline{ID}$ having respective inverted bits of the ID code. Conversely, in the presence of an error, the ID codes ID and $\overline{ID}$ do not satisfy the above-mentioned relationship.

The 24-bit parallel output of the shift register circuit 32 is supplied to a latch 37 and latched by a control pulse. Twelve bits on the less significant side from the latch 37 provide a reproduction ID code ID. Code signals, each having twelve bits, from the latch circuit 37 are supplied to an Exclusive OR circuit 38, and an error pointer EP is generated therefrom. At the Exclusive OR circuit 38, corresponding bits of the two code signals of twelve bits are supplied to the Exclusive OR gates, and the output signals of the twelve exclusive OR gates are supplied to an AND gate, and the error pointer EP is provided at the output of the AND gate. In the absence of an error, an operation of (ID$\oplus\overline{ID}$) is performed at the Exclusive OR circuit 38. As a result, all the outputs of the twelve Exclusive OR gates become 1's. Consequently, the error pointer EP takes a high level in the absence of an error, while it assumes a low level in the presence of an error.

As the ID codes are contained in the error check code, the same identification codes may be recorded doubly, if desired, in a modification of the embodiment. Also, encoding of an error detection code or an error correction code may be done for the ID code, and the ID code and parity (P, Q) developed by the ID code may be employed.

As has been described before, in the present invention, an identification (ID) code for identifying the continuity of each block and an error check code for checking an error of data forming the block are added to each block of data in recording data on a recording medium in the form of a block. In this case, error check capability is maintained with compressed redundancy by inherently providing the identification code with the error check code.

In the first embodiment, the first and second error check codes are employed, and the identification code is inherently contained in the first error check code. In this embodiment, the first error check code is developed by an operation of Exclusive OR between data constituting a block and the ID code. However, the first error check code may be a CRC code, for instance, instead of the code developed by the Exclusive OR operation.

Further, although the CRC code is used as the second error check code in this embodiment, the check code may be a BCH code, a Reed-Solomon code, etc. as described above.

In the second embodiment, a single error check code is employed. The ID code is inherently contained through an operation of Exclusive OR with lower bits of the error check code. In this embodiment, the CRC code is also employed as the error check code. However, other codes may be used. Further, for inclusion of the ID code, the Exclusive OR operation of both is carried out, but both can be integrated based on a predetermined rule. Moreover, to allow the ID code to be contained in the error check code, an operation may be done between the ID code and upper bits, or the intermediate bits, etc. of the error check code.

The third embodiment is an improvement of the second embodiment. In this third embodiment, a code developed by a predetermined operation for the ID code is contained in the error check code in addition to the ID code. Specifically, the ID code and the $\overline{ID}$ code with inverted bits of the ID code are subjected to an operation of Exclusive OR. Also, parity may be added to the ID code to detect or correct an error of the ID code, and these data may be contained in the error check code through an operation of Exclusive OR.

It will be apparent that various modifications and/or additions may be made in the apparatus and method of the invention without departing from the essential feature of novelty involved, which are intended to be defined and secured by the appended claims.

What is claimed is:

1. An encoding method employing an identification code and a first error check code for sequentially recording block data, with plural words, having the identification code and the error check code, onto a recording medium for every occurrence of a predetermined number of words, comprising the steps of:
   forming the error check code from said predetermined number of words for checking an error;
   performing a predetermined operation for combining the error check code and said identification code to form a modified error check code; and
   adding the modified error check code in which said identification code is contained inherently through said predetermined operation to a block containing said predetermined number of words.

2. An encoding method as claimed in claim 1, wherein said error check code is an error detecting code for detection of a data error.

3. An encoding method as claimed in claim 1, wherein said error check code is an error correcting code for detection and/or correction of a data error.

4. An encoding method as claimed in claim 1, wherein said error check code is a cyclic redundancy code.

5. An encoding method as claim in claim 1, wherein said predetermined operation is an Exclusive OR operation.

6. An encoding method as claimed in claim 1, wherein said predetermined number of words include audio data, parity data for correcting an error of the audio data and address data allotted to the audio data.

7. An encoding method as claimed in claim 1, further comprising the steps of developing a second error check code from said predetermined number of words and the first error check code with the identification code contained therein, and adding said second error check code to said block.

8. An encoding method employing an identification code and an error check code for sequentially recording block data, with plural words, having the identification code and the error check code, onto a recording medium for every occurrence of a predetermined number of words, comprising the steps of:
   forming the error check code having a bit number larger than that of the identification code, from said predetermined number of words for checking an error;
   performing a predetermined operation for combining said identification code and the same bits of the error check code as the identification code to form a modified error check code; and
   adding the modified error check code in which said identification code is contained inherently through said predetermined operation to a block containing said predetermined number of words.

9. An encoding method as claimed in claim 8, wherein said predetermined operation is done for lower bits of the error check code and the identification code so that the modified error check code inherently contains the identification code.

10. An encoding method as claimed in claim 8, wherein said predetermined operation is done for upper bits of the error check code and the identification code so that the modified error check code inherently contains the identification code.

11. An encoding method employing an identification code and an error check code for sequentially recording block data having the identification code and the error check code onto a recording medium for every occurrence of a predetermined number of words, comprising the steps of:
   forming the error check code having a bit number larger than that of the identification code, from said predetermined number of words for checking an error;
   developing a modified identification code from this identification code;
   performing a predetermined operation with the identification code, the modified identification code and said error check code to form a modified error check code; and
   adding the modified error check code obtained by said predetermined operation to a block containing said predetermined number of words.

12. An encoding method as claimed in claim 11 wherein the code corresponding to the modified identification code is formed by inverting respective bits of the identification code.

13. An encoding method as claimed in claim 11 wherein the code corresponding to the identification code is parity developed for checking or correcting an error of the identification code.

14. An encoder for encoding an identification code and a first error check code in sequentially recording block data having said codes on a recording medium for every occurrence of a predetermined number of words, comprising:
   means for forming the error check code, from said predetermined number of words for checking of an error;
   means for performing a predetermined operation employing the error check code and the identification code; and
   means for adding the error check code with the identification code contained therein by said predetermined operation to a sequence containing the predetermined number of words and for outputting said sequence.

15. An encoder as claimed in claim 14, wherein said means for performing the predetermined operation performs an Exclusive OR operation.

16. An encoder as claimed in claim 14, further comprising means for forming a second error check code from said first error check code with the identification code contained therein and from said predetermined number of words.

17. An encoder for encoding an identification code and an error check code in sequentially recording block data having said codes on a recording medium for every occurrence of a predetermined number of words, comprising:
   means for forming the error check code, from said predetermined number of words, for checking of an error;
   means for developing a modified identification code;
   means for performing a predetermined operation employing the identification code, the modified identification code and the error check code; and
   means for adding the error check code obtained by said predetermined operation to a sequence containing the predetermined number of words and for outputting said sequence.

18. An encoder as claimed in claim 17, including means for inverting respective bits of the identification code to form a modified identification code.

* * * * *